No. 673,615. Patented May 7, 1901.
T. W. CONNINGTON.
APPARATUS FOR BENDING PLATE GLASS.
(Application filed Aug. 28, 1900.)
(No Model.)
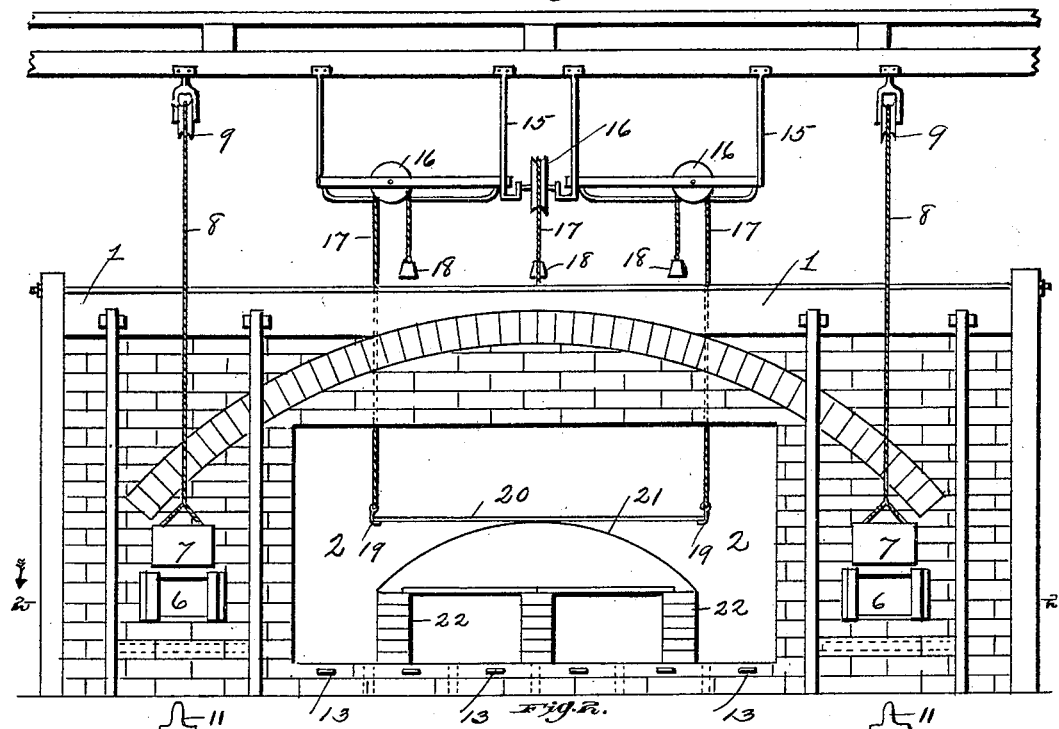
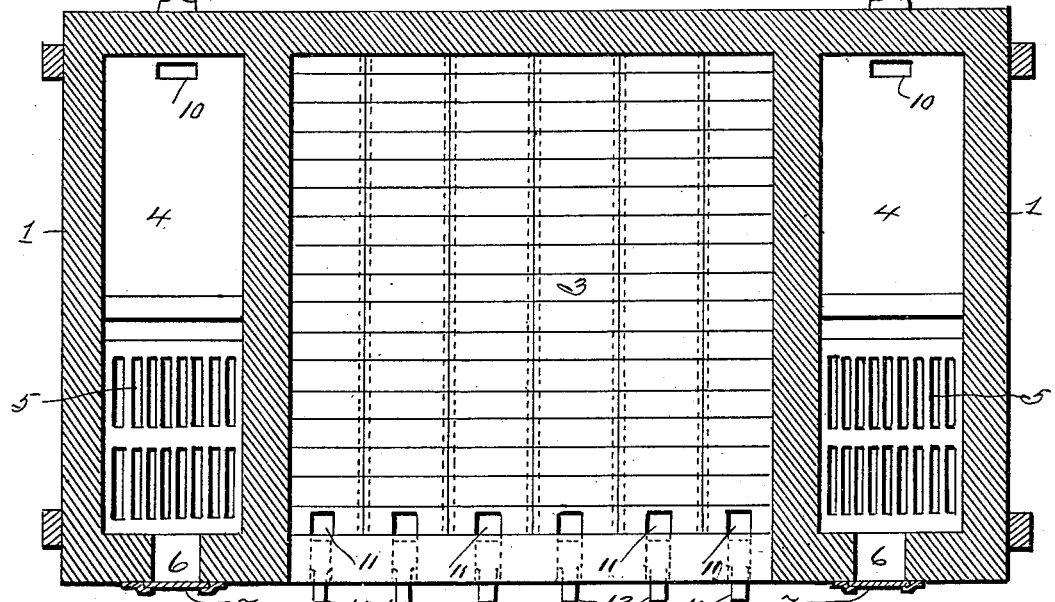
Witnesses: Inventor
T. W. Connington
By O. D. Lewis
Atty.

UNITED STATES PATENT OFFICE.

THOMAS WILLIAM CONNINGTON, OF PARNASSUS, PENNSYLVANIA, ASSIGNOR OF ONE-HALF TO CALVIN W. RARIE, OF SAME PLACE.

APPARATUS FOR BENDING PLATE-GLASS.

SPECIFICATION forming part of Letters Patent No. 673,615, dated May 7, 1901.

Application filed August 28, 1900. Serial No. 28,317. (No model.)

*To all whom it may concern:*

Be it known that I, THOMAS WILLIAM CONNINGTON, a subject of the Queen of Great Britain, residing at Parnassus, in the county of Westmoreland and State of Pennsylvania, have invented certain new and useful Improvements in Apparatus for Bending Plate-Glass; and I do hereby declare the following to be a full, clear, and exact description thereof, reference being had to the accompanying drawings, which form a part of this specification.

This invention relates to certain new and useful improvements in apparatus for bending glass.

The invention has for its object the provision of novel means whereby the present and well-known apparatus of producing glass of this character is entirely dispensed with, thereby greatly reducing the cost of manufacturing and producing an article that will be equal in quality to glass of this character now manufactured.

With the above and other objects in view the invention consists in the novel means of placing and retaining a glass plate within the furnace, subjecting the same to the desired degree of heat, and then forming it into a concaved or convexed shape.

The invention still further consists in the novel means of reducing the above-described class of plate-glass, as will be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a front view of the furnace, showing the same opened and as the plate of glass appears before the same is heated. Fig. 2 is a longitudinal sectional view taken on the line 2 2 of Fig. 1. Fig. 3 is a vertical sectional view of a modified form of forming-plate.

In the drawings the reference-numeral 1 indicates a furnace provided with the front opening 2, which opening is walled or closed when the furnace is in operation. This opening 2 leads into the retort 3, forming the central inner chamber of the furnace, the furnace being further provided with combustion-chambers 4 4 at each side of the retort, said combustion-chambers containing the ordinary grate-bars 5, communicating with openings 6, which openings are closed by means of doors 7, suspended by chains or cords 8, passing over pulleys 9, and balanced by a counterweight. (Not shown in the drawings.)

The reference-numeral 10 indicates flues communicating with the combustion-chambers 4, said flues being provided with suitable dampers 11.

The reference-numeral 12 indicates a series of flues communicating with the retort 3. These flues also are provided with suitable dampers 13.

The reference-numeral 15 indicates brackets rigidly suspended, these brackets carrying pulleys 16, over which operate chains 17, provided at one end with a counterbalance-weight 18 and at their other end with hooks 19, adapted to engage and suspend the glass 20, said chains 17 passing through suitable openings through the upper wall of the furnace. Directly below said plate 20, as shown in the drawings, is arranged a forming-plate 21. The latter may be rigidly or removably secured to the base 22, arranged in the furnace.

The operation of my improved furnace for producing convex plates of glass is as follows: The glass is placed upon the convex-forming plate, as shown in Fig. 1, and held in proper position by means of hooks 19 of the chains 17. The opening 2 is then walled or closed, the dampers 11 closed, and the dampers 13 opened, thus allowing the heat from the combustion-chambers to enter the retort and escape through the series of flues 12. The furnace is then fired until the proper degree of heat is obtained, which will allow the plate of glass to bend upon the convex surface, and as the same becomes heated the ends will tend to bend downwardly, which will operate the chains and the counterbalanced weight. This operation may be observed through suitable openings in the furnace, as are in common use. When the glass is properly shaped, as heretofore described, the dampers 13 are closed and the dampers 11 opened, thus allowing the heat from the combustion-chambers to escape without entering the retort 3, and the wall is then removed from the opening 2, and the finished article may then be taken out of the furnace.

It will be seen that various shapes of forming-plates may be used, such as illustrated in Fig. 3, or other designs may be employed.

It will be noted that various changes may be made in the details of construction without departing from the general spirit of my invention.

Having thus fully described my invention, what I claim as new, and desire to secure by Letters Patent, is—

In a glass-bending furnace, the combination with a suitable former mounted within a furnace, chains passing over suitable pulleys and having hooks fastened to their ends, which hooks engage the opposite edges of a plate of glass resting on said former, whereby, as the plate of glass bends when sufficiently heated, the counterbalanced edges thereof gradually lower on the former, as set forth.

In testimony whereof I have hereunto affixed my signature in the presence of two subscribing witnesses.

THOMAS WILLIAM CONNINGTON.

Witnesses:
LOUIS MOESER,
M. E. HARRISON.